United States Patent [19]

Terada et al.

[11] Patent Number: 4,732,425

[45] Date of Patent: Mar. 22, 1988

[54] SEAT RECLINING MECHANISM FOR VEHICLES

[75] Inventors: Takami Terada; Yukifumi Yamada, both of Toyota, Japan

[73] Assignees: Aisin Seiki Kabushiki Kaisha; Toyota Jidosha Kabushiki Kaisha, both of Aichi, Japan

[21] Appl. No.: 53,549

[22] Filed: May 26, 1987

Related U.S. Application Data

[63] Continuation of Ser. No. 739,846, May 31, 1985.

[30] Foreign Application Priority Data

May 31, 1984 [JP] Japan .............................. 59-81299[U]
Sep. 28, 1984 [JP] Japan ............................ 59-148165[U]

[51] Int. Cl.$^4$ ............................................. B60N 1/06
[52] U.S. Cl. ................................... 297/362; 297/367; 297/368
[58] Field of Search ............... 297/367, 368, 369, 330, 297/362; 248/429

[56] References Cited

U.S. PATENT DOCUMENTS

| 4,113,308 | 9/1978 | Werner et al. | |
|---|---|---|---|
| 4,335,919 | 6/1982 | Nagashima et al. | 297/362 |
| 4,382,630 | 5/1983 | Weston | 297/362 |
| 4,457,557 | 7/1984 | Une | 297/362 |
| 4,504,091 | 3/1985 | Ohshiro | 297/367 X |
| 4,521,055 | 6/1985 | Fudala | 297/362 |
| 4,564,236 | 1/1986 | Kluting | 297/369 |
| 4,576,412 | 3/1986 | Terada | |
| 4,629,251 | 12/1986 | Tezuka | 297/367 |

FOREIGN PATENT DOCUMENTS 0099549 2/1984 European Pat. Off. ............ 297/362

Primary Examiner—James T. McCall
Attorney, Agent, or Firm—Finnegan, Henderson, Farabow, Garrett & Dunner

[57] ABSTRACT

A seat reclining mechanism includes a first bracket attached to a seat back of a seat assembly and a second bracket attached to a seat cushion of the seat assembly, an internal gear provided on the first bracket, an external gear provided on the second bracket for engagement with the internal gear. Both gears are rotatably supported on the eccentric shaft for relative rotation of the first and second brackets. Further, a bearing member is disposed between the first and second brackets for reducing the friction therebetween upon relative rotational movement.

5 Claims, 6 Drawing Figures

FIG. 4
FIG. 6
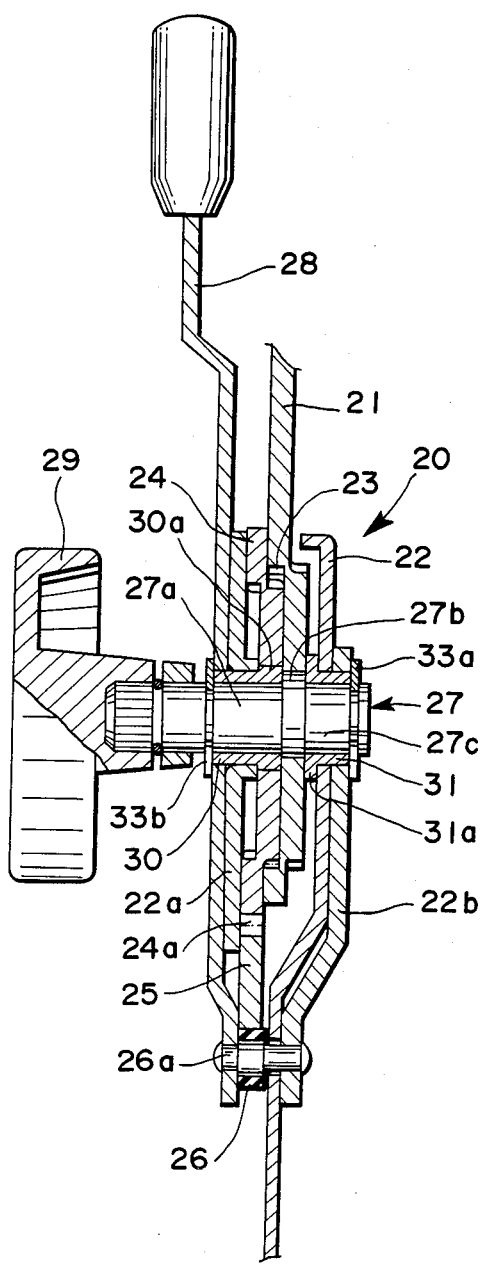
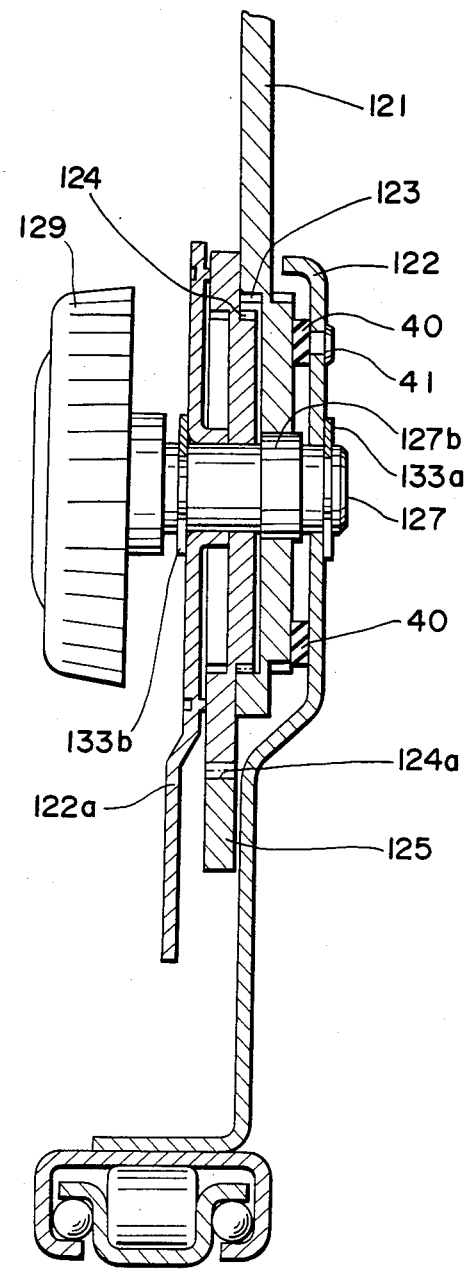

SEAT RECLINING MECHANISM FOR VEHICLES

This is a continuation of application Ser. No. 739,846, filed May 31, 1985.

BACKGROUND OF THE INVENTION

1. Field of the Invention

The present invention relates generally to a seat reclining mechanism for vehicles and more particularly to a seat reclining mechanism having a reduction gear mechanism which includes an internal and an external gear supported on an eccentric shaft.

2. Description of the Prior Art

A conventional seat reclining mechanism for an automobile comprises a first bracket attached to a seat back, a second bracket for seat cushion, and a reduction gear mechanism disposed between the two brackets for changing the position of the first bracket i.e., reclining position of the seat back relative to the fixed position of the seat cushion. The reduction gear mechanism usually includes an internal gear on the seat back bracket and an external gear on the seat cushion bracket. The two gears are in engagement with each other by an eccentric shaft on which the gears are supported. A rotation of the eccentric shaft causes a displacement of the circumferential position of both gears thereby to produce a relative rotation of the internal gear with respect to the external. This will cause a change in the inclination angle of the two seat portion, i.e., seat back and seat cushion. In the seat reclining mechanism of the above type, the reduction gear mechanism requires a relatively large reduction gear ratios so that any reclining position of the seat back relative to the cushion may be kept mostly by the friction force between the eccentric shaft and the internal and external gears.

SUMMARY OF THE INVENTION

It is, therefore, an object of the present invention to provide an improved seat reclining mechanism in which a substantial reduction of the friction between the seat back bracket and seat cushion bracket can be carried out. It is another object of the invention to provide an improved seat reclining mechanism which obviates above conventional drawbacks. It is still further object of the invention to provide a seat reclining mechanism which reduces the required operation force by reducing the friction force between the eccentric shaft and the internal and external gears. According to the present invention, the above and other objects may be accomplished by provision of an improved seat reclining mechanism comprising a first bracket attached to a seat back of a seat assembly and a second bracket attached to a seat cushion of the seat assembly, an internal gear provided on the first bracket, an external gear provided on the second bracket for engagement with the internal gear. Both gears are rotatably supported on the eccentric shaft for relative rotation of the first and second brackets. Further, a bearing members is disposed between the first and second brackets for reducing the friction therebetween upon relative rotational movement.

BRIEF DESCRIPTION OF THE DRAWINGS

FIG. 4 is a cross-sectional view taken along the line IV—IV in FIG. 2;

FIG. 6 is a similar view to FIG. 4 but showing the sectional view of the embodiment of FIG. 5.

DESCRIPTION OF THE PREFERRED EMBODIMENTS

Figure 1:
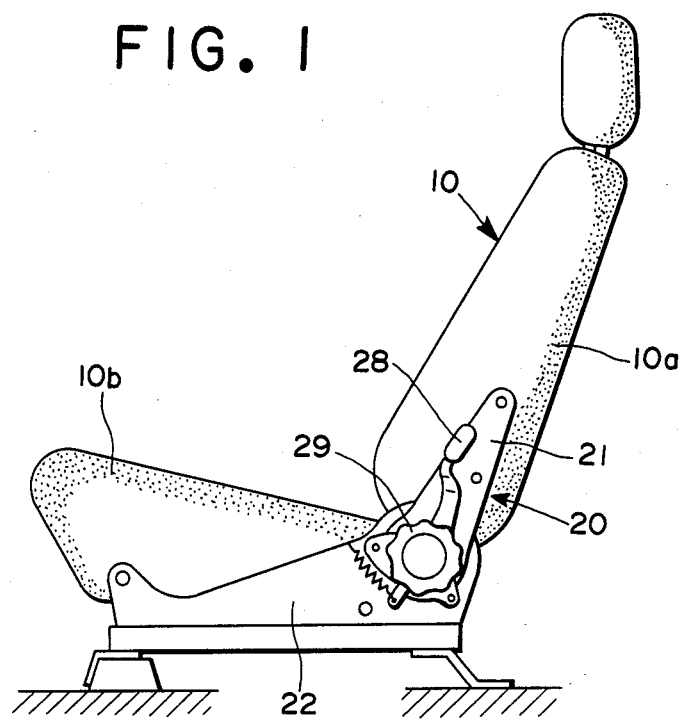
FIG. 1 shows a side view of a seat reclining mechanism with seat assembly having seat back and seat cushion.
Figure 2:
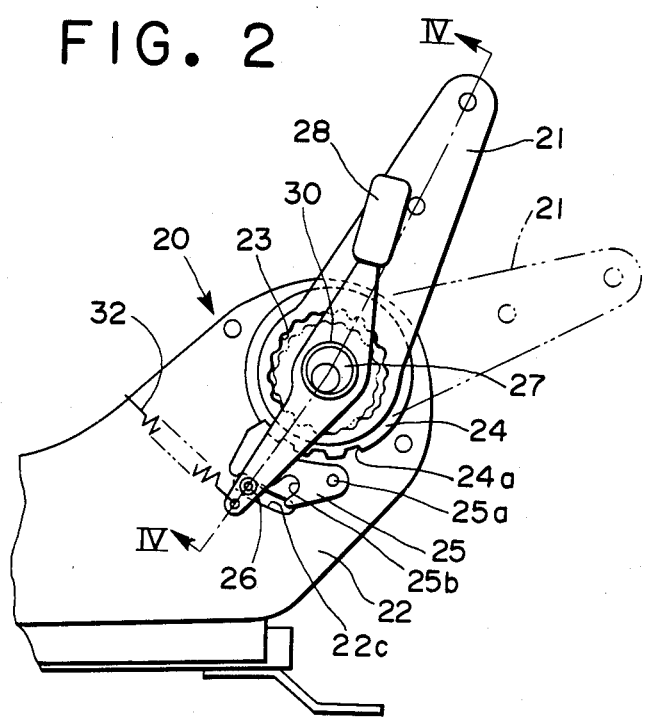
FIG. 2 shows a side view of the seat reclining mechanism according to the present invention.
Figure 3:
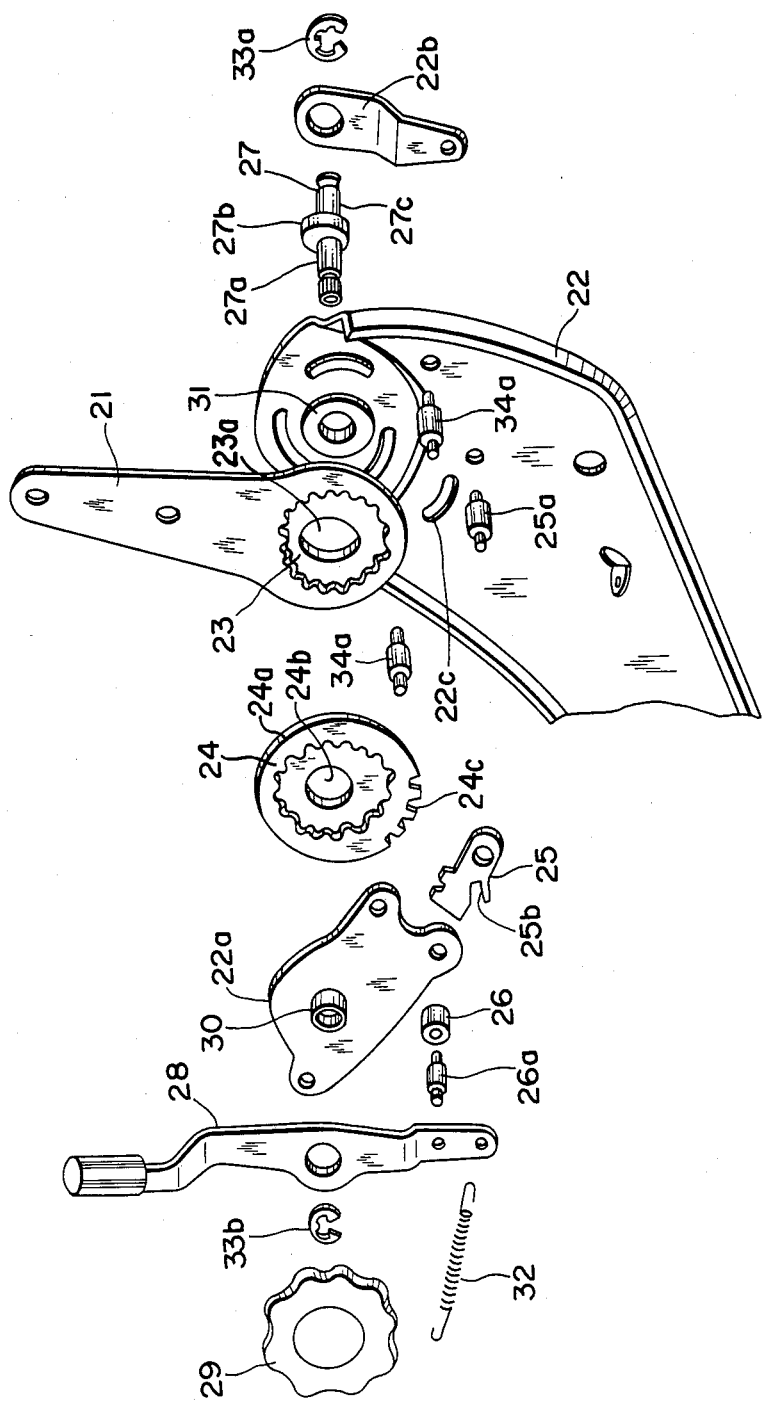
FIG. 3 is an exploded view of the parts of the seat reclining mechanism shown in FIG. 2.
Figure 5:
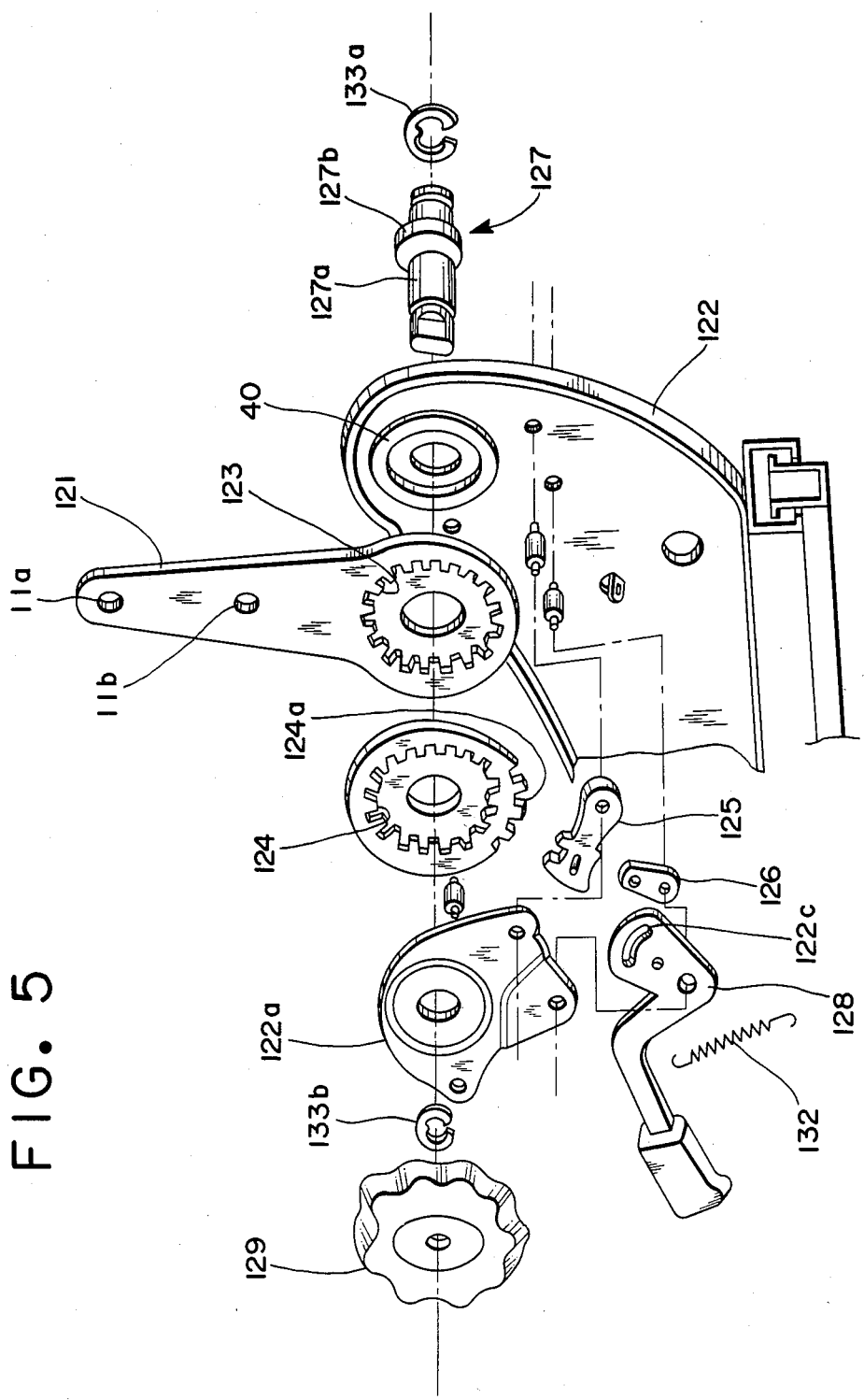
FIG. 5 is a similar view to FIG. 2 but showing another embodiment of the invention.

Referring now to the drawings, numeral 10 in FIG. 1 designates a seat assembly of an automobile and the assembly 10 includes a seat back 10a and seat cushion 10b. A seat reclining mechanism 20 according to the present invention is disposed between the seat back 10a and seat cushion 10b for changing the position of the seat back 10a relative to the fixed position of the seat cushion 10b. Numeral 21 indicates a bracket secured to the seat back and numeral 22 indicates another bracket which is secured to the seat cushion 10b. Both brackets 21 and 22 are operatively connected through the seat reclining mechanism 20. The seat back bracket 21 includes an internal gear 23 formed integral with the bracket 21 and having a pivotal slot 23a as is shown in FIG. 2 and FIG. 3. An external gear 24 formed on a disk plate 24a is engaged with the internal gear 23. The disk plate 24a includes an axial aperture 24b. The number of the teeth of the external gear 24 is less than that of the internal gear 23 by one or more. Instead of the internal and external gears 23, 24, the seat back bracket 21 may be provided with the external gear and the gear plate 24 may be formed with the internal gear. An eccentric shaft 27 includes a coaxial shaft portion 27a, an eccentric shaft portion 27b and a coaxial shaft portion 27c, consecutively. A manual handle 29 is secured to the eccentric shaft 27 for rotation thereof. A plurality of teeth 24c are provided at the outer peripheral portion of the external gear plate 24a with which a pawl 25 is engageable. The pawl 25 is rotatably supported on the seat cushion bracket 22 through pin 25a. An operating lever 28 is pivoted on the eccentric shaft 27. The lever 28 is provided with a roller 26 through pin 26a. A spring 32 is disposed between the lever 28 and the bracket 22 thereby to normally urge the lever in the clockwise direction about the shaft 27 as viewed in FIG. 2. The roller 26 is normally in pressure contact with the pawl 25 to ensure the engagement thereof with the teethed portion 24c of the external gear 24. When the lever 28 is rotated in the counter-clockwise direction, the roller 26 is moved along an arcuate slot 22c provided in the bracket 22 and received in a guide groove 25b formed at the pawl 25. Further movement of the lever 28 rotates the pawl 25 in the counter-clockwise direction about the pin 25a to be disengaged from the teethed portion of the external gear 24. Thus the seat back bracket 21 with gears 23 and 24 becomes freely rotatable about the eccentric shaft 27. A sub-plate 22a is secured to the bracket 22 and is provided with a bearing member 30 which is fitted into an axial hole of the sub-plate 22a and extends axially therewith as is shown in FIG. 3. Similarly, another bearing member 31 is secured to the bracket 22 and extends axially therewith. The bearing member 30 is mounted onto the coaxial shaft portion 27a and is rotatable therewith and the other bearing member 31 is mounted onto the other coaxial shaft portion 27c of the eccentric shaft 27 for rotatably supporting thereof (FIG. 4). The bearing members 30, 31 are of cylindrical shape and the bearing member 30 includes a small outer cylindrical portion on which the operating lever 28 is rotatably supported and a large outer cylindrical portion 30a on which the disk 24a of the external gear 24 is rotatably supported. The bearing member 31 also includes small outer cylindrical portion on which another sub-plate 22b is rotatably supported and large outer cylindrical portion 31a. The seat back bracket 21 and accordingly the internal gear 23 is positioned between the large outer cylindrical flange portions 30a and 31a of the bearing members 30, 31 thereby to be held therebetween. Rings 33a and 33b are provided at each end of the eccentric shaft 27 for preventing the levers from coming off. When the operation of the lever 28 is stopped, the lever 28 is rotated in the clockwise direction in FIG. 2 due to the force of the spring 32. Then the roller 26 rotates the pawl 25 in the clockwise direction about the pin 25a. The pawl 25 then engages with the teeth provided at the outer peripheral portion of the disk plate 24a. The external gear 24 is forced to be moved toward the eccentric shaft 27. Accordingly, the external gear 24 is forced to be pressed onto the bearing member 30. Such pressure is transmitted to the sub-plate 22a. However, the pressure at the bearing member 30 will not be transmitted to the eccentric shaft 27 itself. Similarly, as a reaction, the lever 28 and sub-plate 22b are forced onto the bearing members 30, 31, respectively. However, since the bearings 30, 31 are secured to the sub-plate 22a and seat cushion bracket 22, respectively, they are merely pressed onto the sub-plate and lever without influencing upon the eccentric shaft 27. Thus, the force from the roller 26 will not influence upon the eccentric shaft 27 and there will be no increase in friction force between the shaft 27 and the bearing members 30, 31 thereby to perform a smooth rotational operation of the eccentric shaft 27. In other words, since the eccentric shaft 27 is pivotally supported by the bearing members 30, 31 providing a relatively wide bearing surfaces therebetween, the surface pressure for supporting the shaft 27 is very low, which results in the reduction of the friction force exerted upon the eccentric shaft 27. Reference numerals 34a identifies pins for securing the sub-plate 22a to the seat cushion bracket 22. The other sub-plate 22b is secured to the bracket 22 through pin 26a which also serves to pivot the roller 26. Referring now to another embodiment illustrated in FIG. 5-6, most of the parts shown in this embodiment are similar in structure and function and therefore detailed explanation has been omitted. Each part corresponding to the previous embodiment is indicated by the numeral added 100 to the corresponding one in previous embodiment. In this embodiment, instead of providing the bearing members 30, 31, a spacer ring 40 is disposed between the seat cushion bracket 122 and the seat back bracket 121 for preventing the increase in friction resistance force generated therebetween upon relative reclining movement therebetween. The spacer ring 40 is preferably made from a material having low-friction resistance such as for example, metal or resin. The spacer ring 40 is disposed around the eccentric shaft 27 and secured to the seat cushion bracket 122 by screws 41.

The invention has thus been shown and described with reference to the embodiments, however, it should be noted that the invention is in no way limited to the details of the illustrated structures but changes and modifications may be made without departing from the scope of the appended claims.

What we claim is:

1. An adjustment mechanism for reclining a vehicle seat comprising:
    a first bracket supporting a seat back portion of a seat assembly and having a pivotal slot;
    a second bracket supporting a seat cushion portion of the seat assembly, said first bracket being pivotally mounted adjacent to said second bracket;
    internal gear means formed on said first bracket and having inwardly directed gear teeth eccentrically disposed about said pivotal slot;
    a disc plate adjacent said first bracket and having external gear means disposed in meshed engagement with said internal gear means, said disc plate having an axial aperture and said external gear means having outwardly directed gear teeth circumferentially disposed relative to said axial aperture, the number of said internal gear teeth of said internal gear being more than the number of said external gear teeth;
    shaft means for pivoting said first bracket relative to said second bracket, said shaft means having a pair of coaxial portions and an eccentric portion extending therebetween, said eccentric portion extending through said pivotal slot for rotatably supporting said internal gear means and said first bracket, one of said pair of coaxial portions extending through said axial aperture and the remaining one of said pair of coaxial portions being pivotally attached to said second bracket;
    bearing means mounted on said pair of axial portions of said shaft means for reducing resistance on the periphery of said shaft means, said bearing means including a first bearing member mounted between said first bracket and said second bracket, said first bearing member having a portion extending radially outward relative to said eccentric shaft means to engage and space said first and second brackets and for reducing also radial resistance between said first and second brackets when said first bracket is pivoted relative to said bracket;
    said external gear means including an outer peripheral portion having a plurality of teeth;
    a pawl member adapted to be pivotally mounted on said second bracket for engagement with said plurality of teeth to lock said first bracket relative to said second bracket; and
    an operating lever rotatably supported on said shaft means for controlling the engagement and disengagement between said pawl member and said plurality of teeth.

2. The adjustment mechanism according to claim 1, wherein said radially outward extending portion is an integral flange extending between said first and second brackets, said first bearing member being secured to said first bracket and rotatably supported on said remaining one of said pair of coaxial shaft portions of said shaft means, and wherein said bearing means includes a second bearing member mounted on said one of said pair of coaxial shaft portions and supporting said operating lever.

3. An adjustment mechanism for reclining a vehicle seat comprising:
    a first bracket supporting a seat back portion of the seat;

a second bracket supporting a seat cushion portion of the seat;

a disc plate disposed adjacent a side of said first bracket opposite said second bracket, said disc plate having ratchet teeth extending along a peripheral portion thereof;

gear means interconnecting said disc plate and said first bracket for stepped adjustment of said first bracket relative to said second bracket, said gear means including a first gear engaged with a second gear, said first gear having a greater number of gear teeth than said second gear;

eccentric shaft means pivotally mounted on said second bracket for rotatably supporting said gear means, said shaft means having an eccentric portion and coaxial portion, said first gear being secured to said eccentric portion and said second gear being concentrically mounted on said coaxial portion for engagement with said first gear;

a first bearing member mounted on said eccentric shaft means and extending between said first and second brackets for reducing axial and raidal resistance along said eccentric shaft means;

a subplate supported on said eccentric shaft means and adapted to be secured to said second bracket, said gear means extending between said second bracket and said subplate along said eccentric shaft means, said subplate having a second bearing member fitted into an axial aperture surrounding said eccentric shaft means;

a pawl member pivotally mounted on said second bracket for selective engagement with said ratchet teeth to lock said first bracket relative to said second teeth; and an operating lever rotatably supported on said second bearing member for controlling engagement and disengagement between said pawl member and said ratchet teeth.

4. An adjustment mechanism for reclining a vehicle seat comprising:

a first bracket supporting a seat back portion of a seat assembly and having a pivotal slot;

a second bracket supporting a seat portion of the seat assembly, said first bracket being pivotally attached to said second bracket;

internal gear means formed on said first bracket and eccentrically disposed about said pivotal slot;

a disc plate adjacent said first bracket and having external gear means disposed in meshed engagement with said internal gear means, said disc plate having an axial aperture and said external gear means having external gear teeth circumferentially disposed about said axial aperture, the number of said internal gear teeth being more than the number of said external gear teeth;

shaft means for pivoting said first bracket relative to said second bracket, said shaft means having a pair of coaxial portions and an eccentric portion extending therebetween, said eccentric portion mounted within said pivotal slot for rotatably supporting said internal gear means and said first bracket, one of said pair of coaxial portions extending through said axial aperture and the remaining one of said pair of coaxial portions being pivotally attached to said second bracket, said first bracket being spaced from said second bracket; and a frictionally resistant spacer ring disposed between said first bracket and said second bracket to reduce resistance between said first and second brackets when said first bracket is pivoted relative to said second bracket.

5. The adjustment mechanism according to claim 4, further comprising:

a pawl member pivotally mounted on said second bracket, wherein said external gear means includes an outer peripheral portion having a plurality of teeth for engaging said pawl member being adapted for engagement with said plurality of teeth to lock said first bracket relative to said second bracket; and an operating lever means rotatably supported on said eccentric shaft means for controlling the engagement and disengagement between said pawl member and said teeth.

* * * * *